United States Patent [19]
Lehtola

[11] Patent Number: 5,154,276
[45] Date of Patent: Oct. 13, 1992

[54] DEVICE FOR HANDLING OF RETURNABLE BOTTLES

[75] Inventor: Raimo Lehtola, Kouvola, Finland

[73] Assignee: Halton Oy, Finland

[21] Appl. No.: 768,631

[22] Filed: Jun. 12, 1991

[30] Foreign Application Priority Data

Sep. 4, 1989 [FI] Finland ........................... 894163
Aug. 31, 1990 [WO] PCT Int'l Appl. ... PCT/FI90/00205

[51] Int. Cl.$^5$ ............................................. B65G 47/26
[52] U.S. Cl. ................................. 198/457; 198/481.1; 198/534; 198/956
[58] Field of Search ............... 198/457, 480.1, 481.1, 198/534, 540, 956

[56] References Cited

U.S. PATENT DOCUMENTS

| | | | |
|---|---|---|---|
| 1,861,567 | 6/1932 | Henry | 198/480.1 |
| 3,960,261 | 6/1976 | Planke | 198/534 |
| 4,836,355 | 6/1989 | Blanc | 198/534 |
| 5,065,857 | 11/1991 | Lehtola | 198/457 |

FOREIGN PATENT DOCUMENTS

| | | |
|---|---|---|
| 2306052 | 8/1974 | Fed. Rep. of Germany ...... 198/534 |
| A2104691 | 4/1972 | France . |
| A2112157 | 6/1972 | France . |
| A2132536 | 11/1972 | France . |
| A2234216 | 1/1975 | France . |
| A2316153 | 1/1977 | France . |
| B136884 | 8/1977 | Norway . |
| A5590773 | 8/1977 | Switzerland . |

*Primary Examiner*—Joseph E. Valenza
*Attorney, Agent, or Firm*—Steinberg & Raskin

[57] ABSTRACT

The invention concerns a device (10) for handling of returnable bottles. The device comprises a dropping tube (12), through which a returnable bottle (P) is dropped from an upper position ($E_1$), into a lower position ($E_2$) by the force of gravity. According to the invention, the device (10) for handling of returnable bottles comprises an attenuation device (14) placed in a drop position ($C_1$) underneath the dropping tube (12) and comprising an attenuator part (15) that revolves along with the device (13) that transfers the bottle.

6 Claims, 3 Drawing Sheets

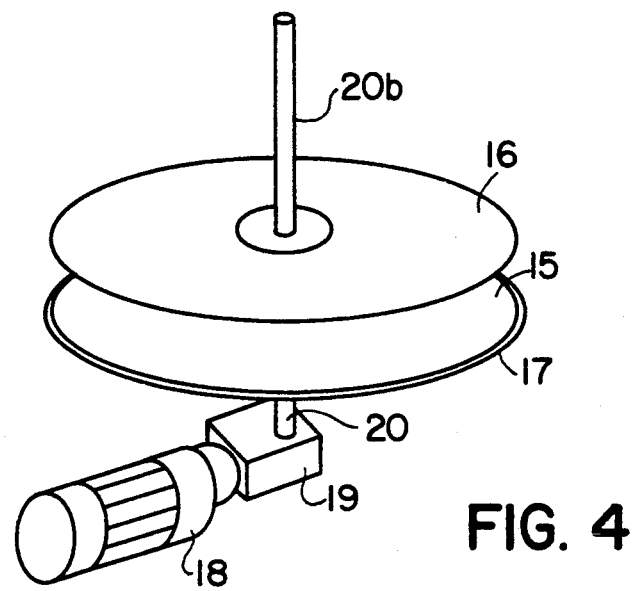
FIG. 4
FIG. 5A
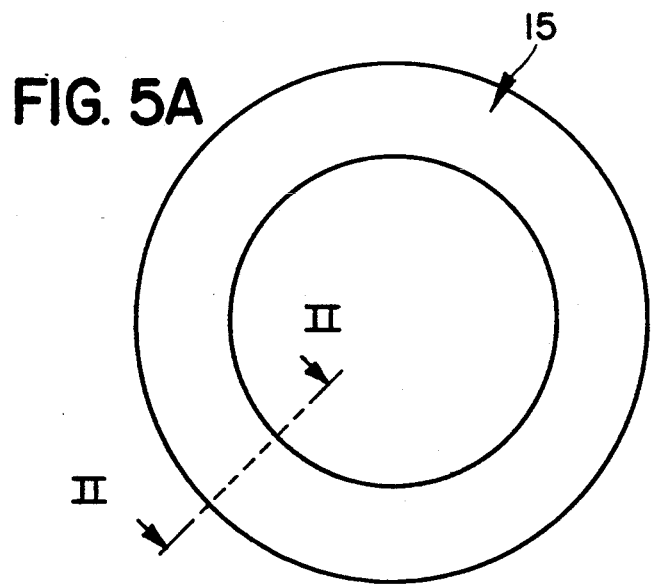
FIG. 5B

DEVICE FOR HANDLING OF RETURNABLE BOTTLES

This application claims priority from international application PCT/FI90/00205, filed Aug. 31, 1990.

BACKGROUND OF THE INVENTION

The invention concerns a device for handling of returnable bottles.

From an earlier patent of the applicant, a device for handling of returnable bottles is known wherein the returnable bottle is transferred from an upper position, i.e. a shop space, into a lower basement space through a dropping tube. The dropping of the bottle is attenuated by means of an attenuation device placed in the position underneath the tube.

OBJECTS AND SUMMARY OF THE INVENTION

The object of the present invention is further improvement of the invention mentioned above. The object is expressly further improvement of the attenuation device placed underneath the tube.

The object of the invention has been achieved by means of a realization wherein an attenuation device has been made of a revolving attenuator part, preferably a ring, that contains an attenuation material. Preferably a liquid is used as the attenuation material.

The device in accordance with the invention is mainly characterized in that the device for handling of returnable bottles comprises an attenuation device placed in the drop position underneath the dropping tube, said attenuation device comprising an attenuator part that revolves along with the device that transfers the bottle.

BRIEF DESCRIPTION OF THE DRAWINGS

The invention will be described in the following with reference to some preferred embodiments of the invention illustrated in the figures in the accompanying drawings, the invention being, however, not supposed to be confined to said embodiments alone.

FIG. 4 is an axonometric view of an attenuator/drive-gear combination in accordance with the invention without a transfer brush.

FIG. 5A shows the attenuator part as viewed from above.

FIG. 5B is a sectional view taken along the line II—II in FIG. 5A.

DETAILED DESCRIPTION

Figure 1:
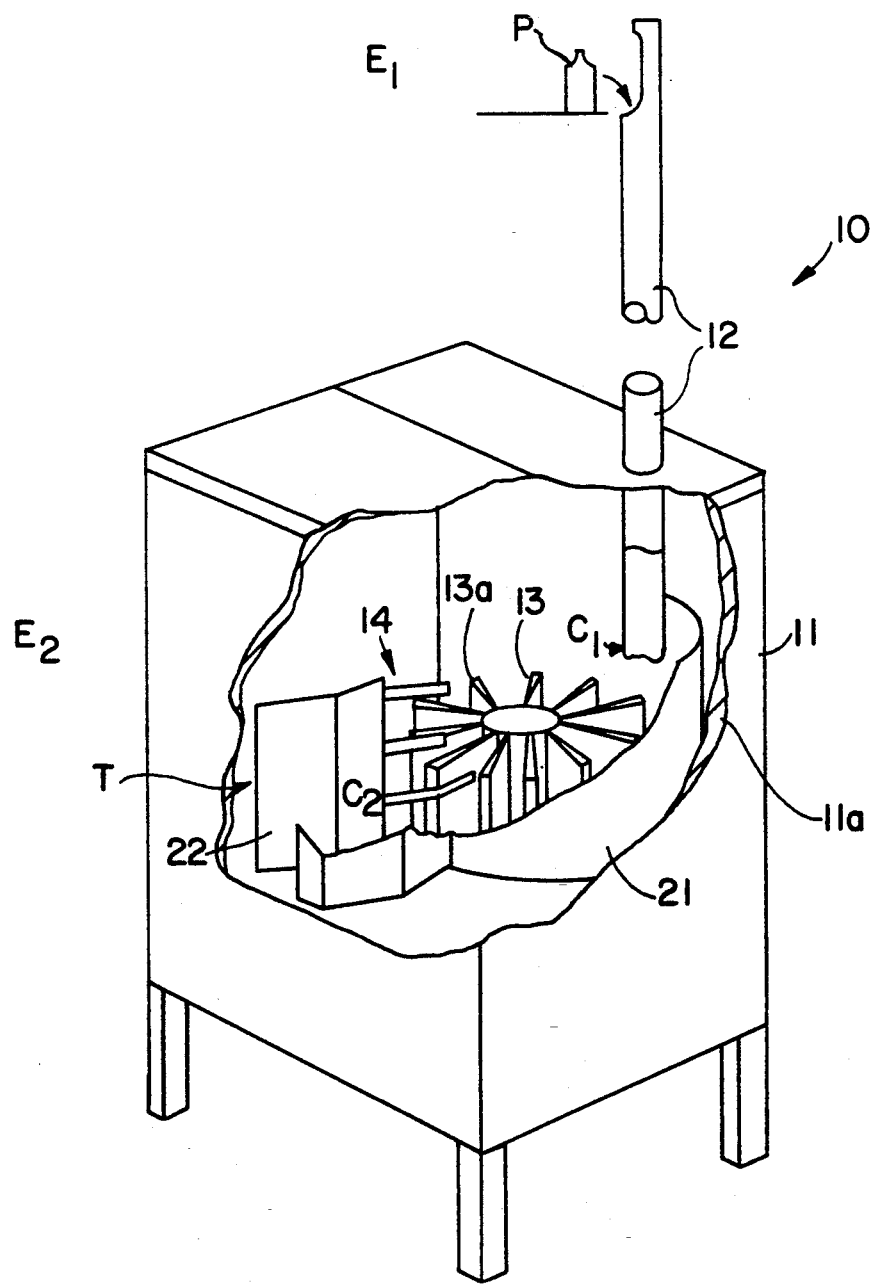
FIG. 1 is an axonometric view of a device in accordance with the invention for handling of returnable bottles.

FIG. 1 shows a device 10 in accordance with the invention for handling of returnable bottles. The device 10 for handling of returnable bottles comprises a protective housing 11, which is preferably provided with a sound attenuation material 11a. In this way the access of noises of dropping to the environment is prevented further. The returnable bottle is dropped from an upper space, e.g. a shop space $E_1$, into a storage space placed underneath, e.g. the basement space $E_2$. The dropping takes place through a dropping tube 12. The bottle P is placed, or carried, e.g., from the bottle receiving device through a separate conveyor arrangement, to the upper end 12a of the tube 12, and it is allowed to fall down freely in the tube 12 into a drop space $C_1$ placed underneath. The equipment further includes a brush 13, which transfers the bottle that has fallen into the position $C_1$ underneath further to the discharge position $C_2$ placed at the proximity of the discharge gate T. The attenuation device 14 that retards the movement of the bottle is placed underneath the brush.

Figure 2:
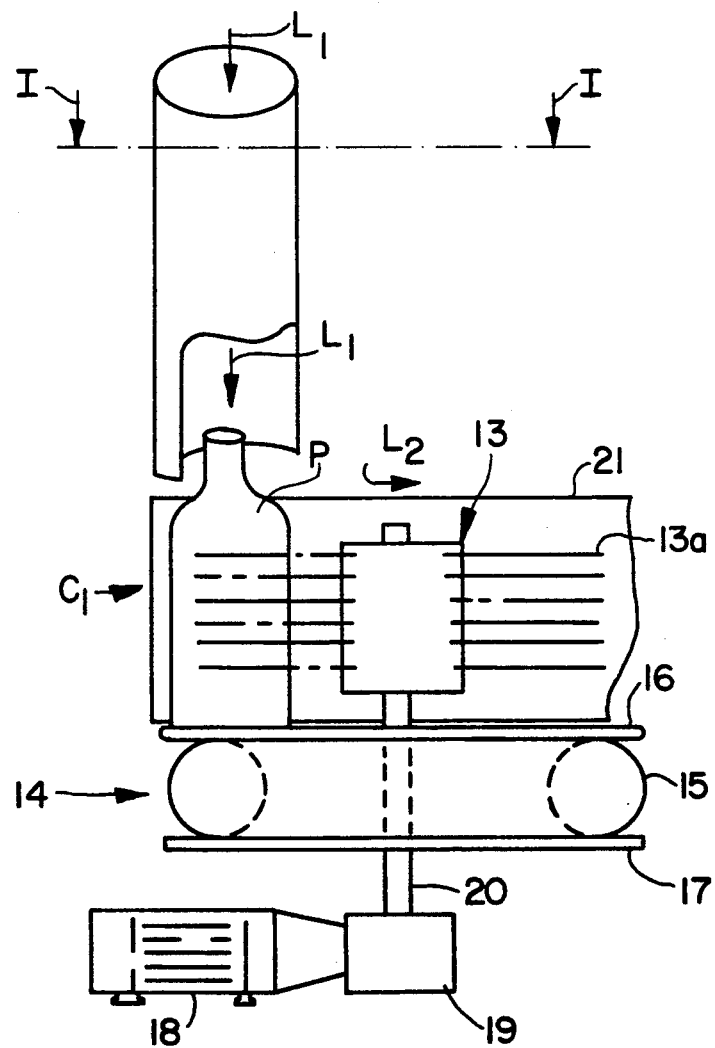
FIG. 2 is a more detailed side view of the device shown in FIG. 1.

FIG. 2 is a more detailed side view of the device in accordance with the invention. The figure shows the end part of the dropping tube 12. The bottle P has fallen by the force of gravity through the tube 12 in the way shown by the arrow $L_1$ into the space $E_2$ placed underneath, into the drop position $C_1$. The bottle P has fallen in between the bristles in the brush 13. The bottle has fallen onto the attenuation device 14.

The attenuation device 14 comprises an attenuator part 15 in accordance with the invention, preferably a ring. An elastic annular drop base 16 is placed on the attenuator part 15, and a lower support plate 17 is placed underneath the attenuator part 15. Thus, the attenuator part 15, preferably a ring, is placed between the drop base 16 and the lower support plate 17.

A drive motor 18 rotates the shaft 20 of rotation by the intermediate of a bevel gear 19. The shaft 20 is connected permanently both to the attenuator part 15 and to the drop base as well as, also, to the lower support plate 17.

When a bottle falls down into the drop position $C_1$ underneath the tube 12, the drop base 16 above the attenuator part 15 yields resiliently. The attenuator part 15 itself contains an attenuation material, preferably attenuation liquid, which retards the movement of the bottle. In stead of a liquid, it is also possible to use an elastic attenuation material inside the attenuation part or the casing of the attenuation part. The lower support plate 17 is preferably a metal plate and of a rigid material, whereby it operates as a support for the constructions placed above. The bottle P placed in the position $C_1$ underneath the dropping tube 12 is transferred by means of the brush 13 along with the curved face of the guide 21 from the position $C_1$ to the discharge position $C_2$ and further to the discharge gate T. The brush device 13 is connected permanently to the shaft 20, so that, when the shaft 20 is rotated by means of the motor 18, both the parts 17,15,16 and the transfer brush 13 revolve.

Figure 3:
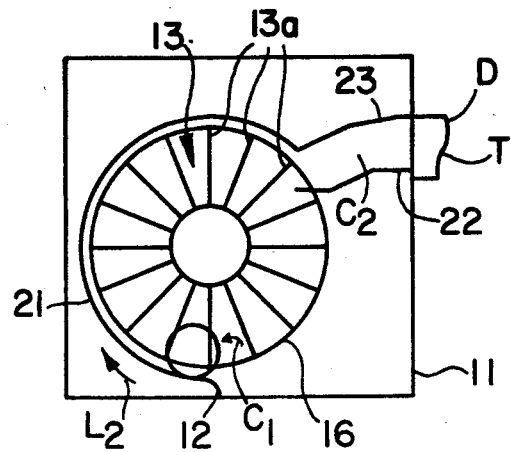
FIG. 3 is a sectional view taken along the line I—I in FIG. 2 on a reduced scale.

FIG. 3 is a sectional view taken along the line I—I in FIG. 2. The returnable bottle P falls out of the tube 12 into the drop position $C_1$, where the bristles 13a of the brush 13 and the guide 21 support it and keep it standing. The shaft 20 and the related devices can be operated so that they revolve and move when the bottle falls out of the tube 12. In such a case, no separate detectors or equivalent are needed to notice the falling of the bottle in the drop position $C_1$. In the drop position $C_1$ the returnable bottle $P_1$ is shifted by means of the brush device 13 in the way shown by the arrow $L_2$ with the aid of the curved guide plate 21 to the guide 22, and thus, along with the rotation of the brush 13 (arrow $L_2$), the returnable bottle P is shifted between the guides 22 and 23 to the discharge position $C_2$ at the discharge gate T. From the discharge position $C_2$ the bottle can be shifted further, e.g., onto a table D or, for example, onto some discharge conveyor.

FIG. 4 is an axonometric view of an attenuator-motor combination in accordance with the invention. By means of the motor 18, the shaft 20 is rotated by the intermediate of the bevel gear 19. The shaft 20 is connected with the rigid lower support plate 17, and the attenuator part 15 is placed on the lower support plate 17, being connected to the shaft 20 and/or to the lower support plate 17 so that, when the shaft 20 is rotated, the lower support plate 17 and the attenuator part 15 revolve at the same time. In a corresponding way, the drop base 16 is connected to the shaft 20 so that it revolves in the direction indicated by the arrow $L_2$ along with the attenuator part 15. The transfer brush 13 is connected to the upper end 20b of the shaft 20 by its hub.

FIGS. 5A and 5B illustrate the preferred embodiment of the attenuator part 15 in accordance with the invention, an attenuator ring. As the attenuator ring 15 it is possible to use, for example, the tube of a car tire or equivalent. The ring shown axonometrically in FIG. 5 comprises a resilient annular casing 15a made of an elastic material, such as rubber, the space 15b for the attenuation material being defined inside said casing. The space 15b for attenuation material is filled with attenuation material 24, advantageously with a liquid and preferably with water.

I claim:

1. Device for handling of returnable bottles, comprising a dropping tube through which a returnable bottle is dropped from an upper position into a lower position by the force of gravity, and an attenuation device placed in a drop position underneath the dropping tube, said attenuation device including a transferring means for transferring the bottle away from said dropping tube and an attenuator part that revolves along with said transferring means, said attenuator part comprising an outer casing having a space defined therein and attenuation material fitted in said space.

2. Device for handling of returnable bottles as claimed in claim 1, characterized in that the attenuation material consists of a liquid.

3. Device as claimed in claim 1, characterized in that the attenuation material consists of an elastic material.

4. Device for handling of returnable bottles as claimed in claim 1, characterized in that the handling device comprises a shaft, a lower support plate placed underneath the attenuator part and a drop base placed above the attenuator part, all of said parts being fitted to revolve along with the shaft rotated by a drive motor.

5. Device for handling of returnable bottles as claimed in claim 4, wherein said transferring means comprises a transfer brush placed above the attenuator part, a curved guide plate, said transfer brush being rotated along with the shaft and by means of which transfer brush the returnable bottle is transferred from the drop position placed underneath the dropping tube being guided by the curved guide plate, into a discharge position, and a discharge gate for returnable bottles, the returnable bottle being transferred from said discharge position to said discharge gate.

6. Device for handling of returnable bottles as claimed in claim 1, characterized in that the attenuator part is a ring.

* * * * *